United States Patent
Atkey et al.

(10) Patent No.: US 7,207,521 B2
(45) Date of Patent: Apr. 24, 2007

(54) ELECTRIC-BASED SECONDARY POWER SYSTEM ARCHITECTURES FOR AIRCRAFT

(75) Inventors: Warren A. Atkey, Bothell, WA (US); Alan T. Bernier, Woodinville, WA (US); Michael D. Bowman, Bellevue, WA (US); Thomas A. Campbell, Seattle, WA (US); Jonathan M. Cruse, Everett, WA (US); Charles J. Fiterman, Mukilteo, WA (US); Charles S. Meis, Renton, WA (US); Casey Y. K. Ng, Sammamish, WA (US); Farhad Nozari, Woodinville, WA (US); Edward Zielinski, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/301,179

(22) Filed: Dec. 12, 2005

(65) Prior Publication Data

US 2006/0102790 A1 May 18, 2006

Related U.S. Application Data

(62) Division of application No. 10/691,440, filed on Oct. 21, 2003.

(60) Provisional application No. 60/420,637, filed on Oct. 22, 2002.

(51) Int. Cl.
B64D 41/00 (2006.01)
(52) U.S. Cl. ....................................... 244/58
(58) Field of Classification Search ............. 244/118.5, 244/53 R, 58, 134 D; 290/1 A; 322/14; 60/784, 801, 802
See application file for complete search history.

(56) References Cited

U.S. PATENT DOCUMENTS

| | | | |
|---|---|---|---|
| 2,777,301 A | 1/1957 | Kuhn |
| 2,960,825 A | 11/1960 | Sampietro |
| 3,057,170 A | 10/1962 | Brahm |
| 3,060,684 A | 10/1962 | Holmes |
| 3,105,631 A | 10/1963 | Hahny |
| 3,177,679 A | 4/1965 | Quick |

(Continued)

FOREIGN PATENT DOCUMENTS

EP     0 888 966 A2    7/1999

OTHER PUBLICATIONS

Air Force Research Laboratory/AFRL, Science and Technology for Tomorrow's Aerospace Forces, Success Story, F-16 Test Aircraft Completes Long Distinguished Career (2 pages) (Date Unknown. Subject of article may be material to this application).

(Continued)

*Primary Examiner*—T. Nguyen
(74) *Attorney, Agent, or Firm*—Perkins Coie LLP

(57) ABSTRACT

Methods and systems for providing secondary power to aircraft systems. In one embodiment, an aircraft system architecture for providing power to an environmental control system includes an electric generator operably coupled to a jet engine. The jet engine can be configured to provide propulsive thrust to the aircraft, and the electric generator can be configured to receive shaft power from the jet engine. The environmental control system can be configured to provide outside air to a passenger cabin of the aircraft in the absence of bleed air from the jet engine.

7 Claims, 7 Drawing Sheets

U.S. PATENT DOCUMENTS

| | | | |
|---|---|---|---|
| 3,194,026 | A | 7/1965 | La Fluer |
| 3,321,930 | A | 5/1967 | La Fluer |
| 3,683,749 | A | 8/1972 | Bayles |
| 4,091,613 | A | 5/1978 | Young |
| 4,312,191 | A | 1/1982 | Biagini |
| 4,419,926 | A | 12/1983 | Cronin et al. |
| 4,426,911 | A | 1/1984 | Robinson |
| 4,434,624 | A | 3/1984 | Cronin et al. |
| 4,462,561 | A | 7/1984 | Cronin |
| 4,494,372 | A | 1/1985 | Cronin |
| 4,503,666 | A | 3/1985 | Christoff |
| 4,514,976 | A | 5/1985 | Christoff |
| 4,523,517 | A | 6/1985 | Cronin |
| 4,533,097 | A | 8/1985 | Aldrich |
| 4,546,939 | A | 10/1985 | Cronin |
| 4,684,081 | A | 8/1987 | Cronin |
| 4,694,654 | A | 9/1987 | Kawamura et al. |
| 4,706,908 | A | 11/1987 | Huffman et al. |
| 4,759,515 | A | 7/1988 | Carl |
| 4,762,294 | A | 8/1988 | Carl |
| 4,910,414 | A | 3/1990 | Krebs |
| 5,074,495 | A | 12/1991 | Raymond |
| 5,145,124 | A | 9/1992 | Brunskill et al. |
| 5,299,763 | A | 4/1994 | Bescoby et al. |
| 5,309,029 | A | 5/1994 | Gregory et al. |
| 5,323,603 | A | 6/1994 | Malohn |
| 5,490,645 | A | 2/1996 | Woodhouse |
| 5,535,601 | A | 7/1996 | Teraoka et al. |
| 5,709,103 | A | 1/1998 | Williams |
| 5,813,630 | A | 9/1998 | Williams |
| 5,899,085 | A | 5/1999 | Williams |
| 5,967,461 | A | 10/1999 | Farrington |
| 6,241,182 | B1 | 6/2001 | Durandeau |
| 6,526,775 | B1 | 3/2003 | Asfia |
| 6,681,592 | B1 | 1/2004 | Lents et al. |
| 6,755,375 | B2 | 6/2004 | Trikha |
| 6,928,832 | B2 | 8/2005 | Lents et al. |
| 2002/0113167 | A1 | 8/2002 | Albero |

OTHER PUBLICATIONS

Boeing Airline Magazine, Oct./Dec. '94, p. 13, Figure 5.
Electrical Actuation for Aircraft Flight Control Surfaces, Dec. 2001 (2 pages); http://www.afrlhorizons.com/Briefs/Dec01/PR0103.html [Accessed Aug. 1, 2003].
Electrically Powered Actuators, Aerospatiale Matra Airbus 2000 (1 page).
GE Develops a Starter/Generator with Pentek Boards, Written in the Summer of 1994, Updated: Summer 1996 (2 pages).
Goldberg, Joshua et al., "AAIA 98-DCHS, A Commercial Application of the Electro-Expulsive Deicing System," 36th Aerospace Sciences Meeting & Exhibit, Jan. 12-15, 1998.
Holly, Harold C., "The Closed-Loop Air-Cycle Option for Equipment Cooling on Aircraft," SAE Technical Paper Series, The Engineering Resource for Advancing Mobility, Fourteenth Intersociety Conference on Environmental Systems, Jul. 16-19, 1984, San Diego, California, 9 pgs.
International Search Report for International Application No. PCT/US03/33542, dated Jun. 1, 2004, Applicant: The Boeing Company (6 pgs).
Rosenbush, Fred M., "ECS Schemes for All Electric Airliners", SAE Technical Paper Series, The Engineering Resource for Advancing Mobility, Twelfth Intersociety Conference on Environmental Systems, Jul. 19-21, 1982, San Diego, California, 14 pgs.
Chang, M. et al.; "Preliminary (Issue #1) Power-by-Wire Development and Demonstration—Electrical Power Center Module Requirements and Specifications;" McDonnell Douglas Aerospace Transport Aircraft; Nov. 1994; 102 pgs.
Chang, M. et al., "Preliminary (Issue #3) Power-by-Wire Development and Demonstration—Power Management and Distribution Requirements and Specifications;" McDonnell Douglas Aerospace Transport Aircraft; Jun. 1995; 119 pgs.
"Meeting Minutes from the NASA PBW Critical Design Review (CDR);" McDonnell Douglas Aerospace Transport Aircraft; Jul. 9, 1996; 447 pgs.
Williams, Kenneth R., "Integrated Power Systems for Future Transport Aircraft," Transport Aircraft Division; McDonnell Douglas Aerospace Transport Aircraft; Jan. 3, 1997; 8 pgs.
"Power-by-Wire Program;" McDonnell Douglas Aerospace Transport Aircraft, Oct. 19, 1993; NASA Lewis Planning Meeting: Cleveland, OH; 64 pgs.
Groom, Nelson J. et al., "Electric Flight Systems," NASA Conference Publication 2209, Hampton, Virginia, Jun. 9-10, 1981, 272 pgs.
"Aircraft Electric Secondary Power," Proceedings of a Conference held at NASA Lewis Research Center, Cleveland, Ohio, Sep. 14-17, 1982, NASA Conference Publication 2282, 50 pgs.
IEEE 1983 National Aerospace and Electronics Conference, NAECON 1983, pp. i-ii, 74-79.
Tagge, G.E., et al., "Systems Study for an Integrated Digital/Electric Aircraft (IDEA)," NASA, 1985, 214 pgs.
Murray, W. E. et al., "Evlauation of All-Electric Secondary Power for Transport Aircraft," NASA Contractor Report 189077, Jan. 1992, 314 pgs.
Weimer, Joseph A., "21st Century Plane, Powering the United States Air Force," Presented at Indiana Energy Technology Sizzle, Purdue University, accessed prior to Dec. 20, 2000, 14 pgs.
"All-Electric Aircraft, vol. I and vol. II," presented at IEEE/AESS Symposium, Dayton, Ohio, Nov. 30, 1983, 90 pgs.

US 7,207,521 B2

ELECTRIC-BASED SECONDARY POWER SYSTEM ARCHITECTURES FOR AIRCRAFT

CROSS-REFERENCE TO RELATED APPLICATION(S)

This application is a divisional of U.S. patent application Ser. No. 10/691,440, filed Oct. 21, 2003, which claims priority to U.S. Provisional Patent Application No. 60/420,637, which was filed Oct. 22, 2002 and is incorporated herein in its entirety by reference. This application incorporates U.S. Pat. No. 6,526,775 in its entirety by reference.

TECHNICAL FIELD

The following disclosure relates generally to secondary power systems for aircraft and, more particularly, to electric-based secondary power systems for aircraft.

BACKGROUND

Conventional transport aircraft typically utilize pneumatic, hydraulic, and electric power from main engines to support various aircraft systems during flight. In addition, conventional transport aircraft typically utilize pneumatic and electric power from on-board auxiliary power units (APUs) to support aircraft systems during ground operations. Aircraft air conditioning systems are typically the largest secondary power users on commercial transport aircraft. On conventional transport aircraft, these systems use high temperature/high pressure air extracted from the engine compressor stages ("bleed air"). The air passes through air conditioning packs before passing into the fuselage to meet temperature, ventilation, and pressurization needs. The conditioned air is then discharged from the fuselage through outflow valves or through normal cabin leakage. During ground operations, the APU can provide bleed air either from a separate shaft-driven load compressor or from a power section compressor. Similar to the bleed air from the main engines, the high temperature and high pressure air from the APU passes through air conditioning packs before passing into the fuselage.

FIG. 1 schematically illustrates a conventional pneumatic-based secondary power system architecture 100 configured in accordance with the prior art. The system architecture 100 can include jet engines 110 (shown as a first engine 110a and a second engine 110b) for providing propulsive thrust to the aircraft (not shown). In addition to thrust, the engines 110 can also provide high temperature/high pressure air to a bleed manifold 120 via bleed ports 112 (identified individually as a first bleed port 112a and a second bleed port 112b). The bleed ports 112 receive air from the compressor stages of the engines 110, and pass the air through heat exchangers 114 (such as precoolers) that cool the air before it passes to the bleed manifold 120.

The high pressure air from the bleed manifold 120 supports the majority of secondary power needs of the aircraft. For example, a portion of this air flows to air conditioning packs 140 (shown as a first air conditioning pack 140a and a second air conditioning pack 140b) that supply conditioned air to a passenger cabin 102 in a fuselage 104. The air conditioning packs 140 include a series of heat exchangers, modulating valves, and air cycle machines that condition the air to meet the temperature, ventilation, and pressurization needs of the passenger cabin 102. Another portion of air from the bleed manifold 120 flows to turbines 160 that drive high capacity hydraulic pumps 168. The hydraulic pumps 168 provide hydraulic power to the landing gear and other hydraulic systems of the aircraft. Yet other portions of this high pressure air are directed to an engine cowl ice protection system 152 and a wing ice protection system 150.

The wing ice protection system 150 includes a valve (not shown) that controls the flow of bleed air to the wing leading edge, and a "piccolo" duct (also not shown) that distributes the hot air evenly along the protected area of the wing leading edge. If ice protection of leading edge slats is required, a telescoping duct can be used to supply hot bleed air to the slats in the extended position. The ice protection bleed air is exhausted through holes in the lower surface of the wing or slat.

In addition to the engines 110, the system architecture 100 can also include an APU 130 as an alternate power source. The APU 130 is typically started by a DC starter motor 134 using a battery 136. The APU 130 drives a compressor 138 that provides high pressure air to the bleed manifold 120 for engine starting and other ground operations. For engine starting, the high pressure air flows from the bleed manifold 120 to start-turbines 154 operably coupled to each of the engines 110. As an alternative to the APU 130, bleed air from a running one of the engines 110 can be used to re-start the other engine 110. As a further alternative, an external air cart (not shown in FIG. 1) can provide high pressure air for engine starting on the ground.

The system architecture 100 can further include engine-driven generators 116 operably coupled to the engines 110, and an APU-driven generator 132 operably coupled to the APU 130. In flight, the engine-driven generators 116 can support conventional electrical system loads such as a fuel pump 108, motor-driven hydraulic pumps 178, and various fans, galley systems, in-flight entertainment systems, lighting systems, avionics systems, and the like. The APU-driven generator 132 can support these functions during ground operations and during flight as required. The engine-driven generator 116 and the APU-driven generator 132 are typically rated at 90–120 kVA and produce a voltage of 115 Vac. They can provide power to transformer-rectifier units that convert 115 Vac to 28 Vdc for many of the abovementioned electrical loads. The power is distributed through an electrical system based largely on thermal circuit-breakers and relays.

The system architecture 100 can additionally include engine-driven hydraulic pumps 118 operably coupled to the engines 110. The hydraulic pumps 118 provide hydraulic power to control surface actuators and other aircraft systems in flight. Electric-motor driven pumps 178 can provide back-up hydraulic power for maintenance activities on the ground.

FIG. 2 is a schematic top view of a prior art aircraft 202 that includes the secondary power system architecture 100 of FIG. 1. The aircraft 202 includes a forward electronic equipment bay 210 that distributes electrical power to a plurality of electrical loads 220 associated with the system architecture 100 described above. In flight, the electronic equipment bay 210 can receive electrical power from the engine generators 116, as well as the APU 130. On the ground, the electronic equipment bay 210 can receive electrical power from the APU 130, or from an external power source 212 via a receptacle 213.

One shortcoming of the secondary power system architecture 100 described above is that it is sized for a worst case operating condition (typically, cruise speed, high aircraft load, hot day, and one engine bleed air system failed) to ensure sufficient air flow is available to meet system demands at all times. As a result, under typical operating conditions, the engines 110 provide bleed air at a significantly higher pressure and temperature than the air conditioning packs 140 and the other aircraft systems demand. To compensate, the precoolers 114 and the air conditioning packs 140 regulate the pressure and temperature to lower values as required to meet the demands for fuselage pressurization, ventilation, and temperature control. Consequently, a significant amount of energy is wasted by precoolers and modulating valves during this regulation. Even under optimum conditions, a significant amount of energy extracted from the engines 110 is wasted in the form of heat and pressure drops that occur in the ducting, valves and other components associated with the bleed manifold 120 and the air conditioning packs 140.

SUMMARY

The present invention is directed generally toward secondary power systems for aircraft and methods for providing secondary power to aircraft systems. In one embodiment, an aircraft configured in accordance with one aspect of the invention includes a fuselage and a jet engine configured to provide propulsive thrust to the aircraft. The aircraft can further include an electric generator operably coupled to the jet engine, and an environmental control system. The environmental control system can include at least one compressor motor configured to receive electric power from the electric generator to provide outside air to the fuselage in the absence of bleed air from the jet engine.

In another aspect of this embodiment, the aircraft can include a wing extending outwardly from the fuselage, and an electrothermal wing ice protection system. The electrothermal wing ice protection system can be configured to receive electric power from the electric generator to at least reduce the formation of ice on a portion of the wing in the absence of bleed air from the jet engine. In a further aspect of this embodiment, the electric generator can be a first electric generator, and the aircraft can additionally include an auxiliary power unit and a second electric generator. The second electric generator can be operably coupled to the auxiliary power unit and configured to receive shaft power from the auxiliary power unit. In this aspect, the at least one compressor motor of the environmental control system can be configured to receive electric power from the second electric generator to provide outside air to the passenger cabin in the absence of compressed air from the auxiliary power unit.

In another embodiment, a method for providing conditioned air to a fuselage of an aircraft can include providing a compressor fan in flow communication with the fuselage, and operably coupling an electric motor to the compressor fan to drive the compressor fan. The method can further include operably coupling an electric generator to a jet engine of the aircraft, and providing electric power from the electric generator to the electric motor to drive the compressor fan. In one aspect of this embodiment, the compressor fan can be driven to flow air from outside the fuselage into the fuselage in the absence of bleed air from the jet engine.

DETAILED DESCRIPTION

The following disclosure describes systems and methods for providing power to aircraft systems. Certain details are set forth in the following description and in FIGS. 3–7 to provide a thorough understanding of various embodiments of the invention. Other details describing well-known structures and systems often associated with the aircraft and/or aircraft secondary power systems are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 310 is first introduced and discussed with reference to FIG. 3.

Figure 3:
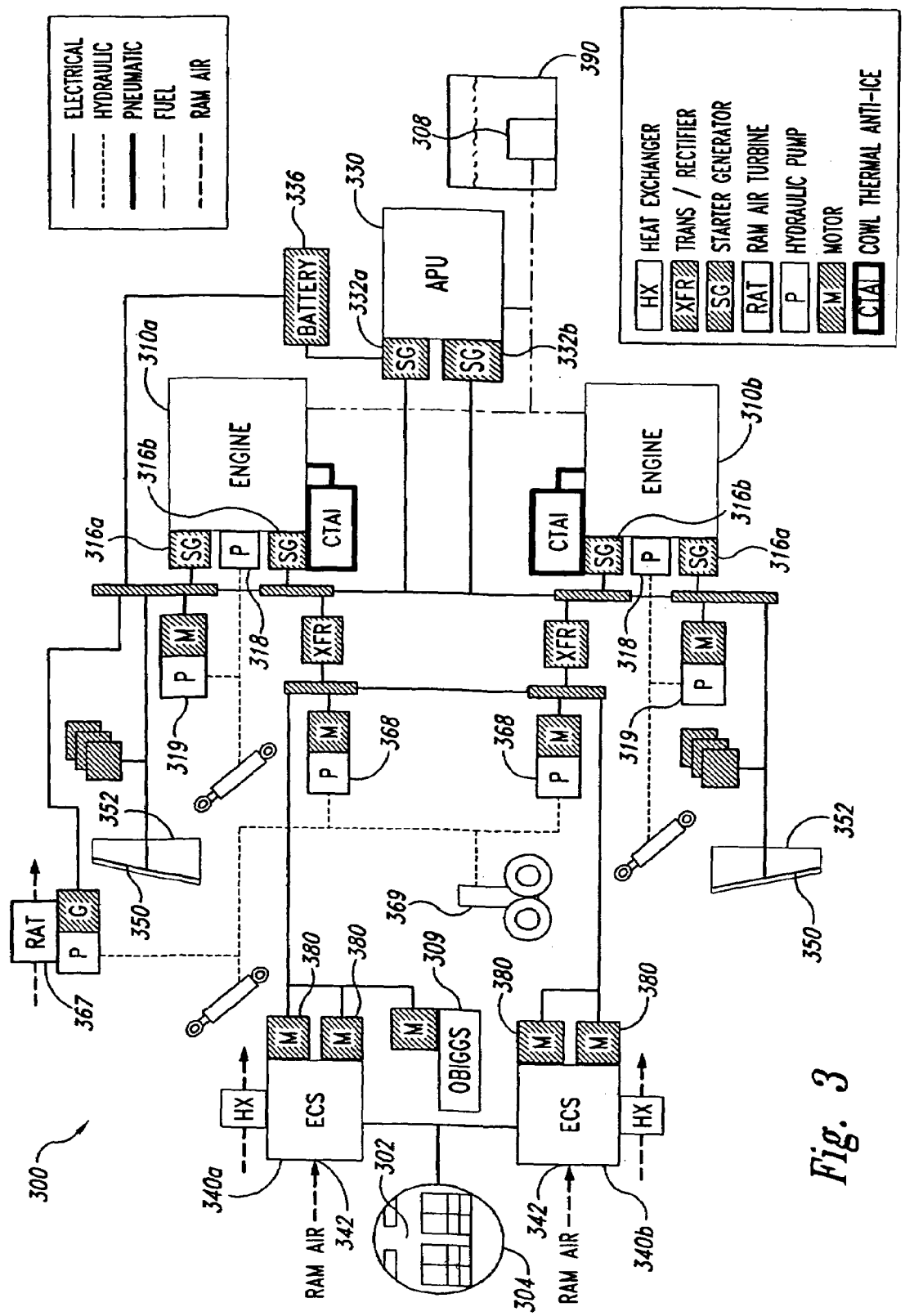
FIG. 3 is a schematic diagram illustrating an electric-based secondary power system architecture configured in accordance with an embodiment of the invention.

FIG. 3 is a schematic diagram illustrating an electric-based secondary power system architecture 300 configured in accordance with an embodiment of the invention. In one aspect of this embodiment, the system architecture 300 includes a first engine 310a and a second engine 310b for providing propulsive thrust to an aircraft (not shown). As described in greater detail below, a first starter/generator 316a and a second starter/generator 316b can be operably coupled to each of the engines 310 to provide electrical power to a plurality of aircraft systems on an on-demand basis. The starter/generators 316 support a majority of the aircraft functions that were traditionally performed by the bleed-air system described above in FIG. 1. These functions can include fuselage air conditioning and pressurization, engine starting, and wing ice protection among others.

In another aspect of this embodiment, the system architecture 300 further includes an APU 330 for providing power to aircraft systems when needed during ground operations and in flight. Power for starting the APU 330 can be provided by an aircraft battery 336, an external ground power source (not shown), or one or more of the engine-driven starter/generators 316. Power from the APU 330 is provided by a first APU starter/generator 332a and a second APU starter/generator 332b, each of which are operably coupled to the APU 330.

In contrast to the conventional APU 130 described above with reference to FIG. 1, the APU 330 provides only electric power to the various aircraft systems. Consequently, it can be much simpler than the APU 130 because all of the components associated with pneumatic power delivery can be eliminated. This feature can result in a significant improvement in APU reliability and a reduction in required maintenance.

In a further aspect of this embodiment, the system architecture 300 includes an environmental control system having a first air conditioning pack 340a and a second air conditioning pack 340b. The air conditioning packs 340 are configured to provide conditioned air to a passenger cabin 302 in a fuselage 304 to meet temperature, pressure, and air conditioning needs. In one embodiment, the air conditioning packs 340 can be at least generally similar to one or more of the air conditioning systems disclosed in U.S. Pat. No. 6,526,775, which is incorporated herein in its entirety by reference. In another embodiment, the air conditioning packs 340 can include adjustable speed electric compressor motors 380 configured to receive electric power from the engines 310 during flight and the APU 330 during ground operations. The compressor motors 380 drive compressors (not shown) that receive fresh outside air via ram air inlets 342. The fresh air is compressed and flows from the air conditioning packs 340 into the fuselage 304 to meet the pressurization and temperature control needs of the cabin 302. In one embodiment, the system architecture 300 can include one or more variable speed fans (not shown) to distribute the air to various parts of the fuselage 304 at different flow rates to meet the particular demands of the fuselage 304 at any given time. Tailoring the power draw from the engines 310 in this manner can further increase fuel efficiency.

The adjustable speed compressor motors 380 allow the cabin air pressure and air flow to be varied based on cabin volume, occupant count, and/or the desired cabin pressure altitude. For example, if a lower cabin altitude is desired (higher pressure), then the electric ECS system of the present invention can accommodate this by increasing inflow with the adjustable speed compressor motors 380 and/or decreasing outflow from the fuselage 304. In general, conventional pneumatic systems do not have the ability to lower cabin altitudes much below their design points (e.g., 8000 ft) because the systems are typically sized for the design point. Another benefit of the electric approach to air conditioning over the conventional pneumatic approach is that the energy extracted from the engines for the electric approach is not wasted by pre-coolers and modulating valves in the air conditioning packs 340. Instead, the compressor motors 380 only draw enough electric power from the engines 310 as is required by the adjustable speed compressors to meet the immediate pressurization needs of the cabin 302. This real-time energy optimization can be extended to other electric power users across the aircraft platform to improve fuel efficiency. As described below, for example, such users can include recirculation fans, Lavatory and galley vent fans, cargo heating, wing ice protection, and hydraulic actuation. By only drawing the energy needed, fuel economy can be increased.

In another aspect of the invention, the system architecture 300 further includes a wing ice protection system 350 that utilizes electrical power from the engines 310. The wing ice protection system 350 can be configured in accordance with at least two embodiments of the present invention to prevent or at least reduce the formation of ice on a portion of a wing 352. In an electrothermal ice protection embodiment, heating elements such as blankets (not shown) can be bonded or otherwise positioned proximate to interior portions of the wing leading edges. For wing ice protection, the heating blankets can be energized sequentially to heat the wing leading edge causing any ice build-up to melt and/or detach from the wing leading edge. This method can be significantly more efficient than conventional bleed air systems because desired portions of the wing leading edge are heated sequentially rather than simultaneously. Consequently, the power draw for ice protection is significantly reduced. In addition, in contrast to bleed air systems, there are no bleed air exhaust holes on the wings. As a result, aircraft drag and community noise are reduced relative to conventional systems.

The wing ice protection system 350 can also operate as an electromechanical system in accordance with another embodiment invention. In this embodiment, electromechanical actuators (not shown) in an interior portion of the wing leading edges can be configured to briefly vibrate the wing leading edge, causing any ice build-up to detach and fall away. This embodiment may require significantly less electrical power than the electrothermal embodiment discussed above. In either embodiment, the wing ice protection system 350 can be broken up into different segments that apply to different regions of the wing or slat leading edge. That way, if one portion of the wing leading edge does not require ice protection, then that section of the wing ice protection system 350 can be turned off, resulting in a further reduction in power demand from the engines. Additionally, different sections of the ice protection system can be cycled according to different schedules as required to sufficiently reduce ice while optimizing power usage.

In another aspect of this embodiment, the starter/generators 316 can be dual-function devices that provide electrical power for aircraft systems when operating as generators, and shaft power for engine starting when operating as starters. This electrical start capability can enhance the in-flight starting sequence of the engines 310 in the event one or more of the main engines 310 shuts down during normal flight operations. For example, typical high bypass ratio engines may have difficulty restarting during all flight regimes because the in-flight windmill effect may not provide enough torque. In contrast, the starter/generators 316 of the present invention are configured to receive electric power from any number of electrical sources on the aircraft to assist the engines 310 during an in-flight restart by providing additional starting torque.

To start the engines 310, the starter/generators 316 can be run as synchronous starting motors with the starting process controlled by engine start converters (not shown). The engine start converters can provide conditioned electrical power (e.g., adjustable voltage and frequency) to the starter/generators 316 during the start process for optimum start performance. The engine start converters can also function as motor controllers for the cabin pressurization compressor motors 380 and/or other adjustable speed motors on the aircraft. Similarly, an APU start converter (not shown) can function as a motor controller for other adjustable speed motors on the aircraft such as an on-board inert gas generation system (OBIGGS) 309. The power necessary to energize the starter/generators 316 for engine starting can come from the aircraft battery 336, the APU 330, a ram air turbine (RAT) 367, a fuel cell (not shown), or other sources. The dual-function aspect of the starter/generators 316 is not offered by the air turbine engine-starters 154 described above with reference to FIG. 1. Unlike the starter/generators 316, the air turbine engine-starters 154 serve no purpose while the engines 110 are running.

In a further aspect of this embodiment, the starter generators 316 can be directly coupled to gear boxes of the engines 310 such that they operate at frequencies (e.g., 360–700 Hz) proportional to the engine speeds. This type of generator may be the simplest and most efficient approach because the generator does not include a complex constant speed drive. As a result, in this embodiment the starter/generators 316 may be more reliable and have lower spares costs than conventional generators having complex constant speed drives. In other embodiments, however, other types of generators can be used. For example, in one other embodiment where a constant speed is desirable, a constant speed generator can be used.

In a further aspect of this embodiment, the system architecture 300 includes a hydraulic system that has left, right, and center channels. The hydraulic power for the left and right channels can be provided by engine-driven hydraulic pumps 318 that are operably coupled to each of the engines 310. In addition, smaller electric motor-driven hydraulic pumps 319 can also provide hydraulic power to the left and right channels for ground operations and to supplement the engine-driven pumps 318. The engine-driven pumps 318 can provide hydraulic power for flight control actuators, stabilizer trim actuators, and other functions. The hydraulic power for the center channel is provided by two large-capacity electric motor-driven hydraulic pumps 368. In contrast to the hydraulic pumps 168 described above with reference to FIG. 1, which are driven by engine bleed air to meet peak hydraulic demands, the hydraulic pumps 368 are driven by electric power from the engines 310. The hydraulic pumps 368 can provide hydraulic power for a landing gear system 369 and other systems, including flight control actuation, thrust reversers, brakes, leading/trailing edge flaps, and a nose gear steering system (not shown). In a further aspect of this embodiment, only one of the hydraulic pumps 368 runs throughout an entire flight, while the other pump only operates during takeoff and landing.

In another aspect of this embodiment, the system architecture 300 can include a plurality of adjustable-speed fuel pumps 308 to transfer fuel from a fuel tank 390 to one or more of the engines 310 or to another fuel tank (not shown). Typical commercial aircraft use fuel pumps to transfer fuel from one area of the wing to another. This allows the aircraft to maintain a center of gravity that maximizes aircraft performance. In the conventional pneumatic-based system architecture 100 described above with reference to FIG. 1, constant-speed fuel pumps are typically included for transferring fuel from one tank to the next or to the engines 110. These constant-speed fuel pumps are typically configured to operate at a maximum pressure at all times, even though the flow rate corresponding to this maximum pressure is seldom required to adequately transfer fuel between tanks or to the engines 110. For this reason, such fuel systems typically include pressure regulators that simply bleed off the excess fuel pressure. This excess fuel pressure corresponds to wasted engine power. In contrast, in the electric-based architecture 300 of FIG. 3, the fuel pump speeds can be varied to transfer fuel from one tank to the next based on the amount of fuel needed for transfer and the rate at which the transfer needs to occur to optimize the overall center of gravity of the aircraft during normal flight conditions. The ability to maintain an optimum center of gravity throughout the flight segment in this manner can further improve aircraft range and fuel efficiency by only drawing the amount of power actually needed by the fuel pump at any given time.

A number of other systems can be incorporated into the system architecture 300 to further reduce the power extracted from the engines 310. For example, in one embodiment, adjustable- or variable-speed fans can be used in the air conditioning packs 340 that tailor the power extracted from the engines 310 based on fan speed. In another embodiment, resistive heaters can be used to warm cargo holds (not shown) instead of the bleed air used in conventional systems. These resistive heaters can have the ability to be pulse-width modulated to better control temperature and further reduce energy consumption. Similarly, the cargo air conditioning systems can be configured to rely less on outside air and more on recirculated air for compartment cooling. In this manner, the energy losses associated with outside air are eliminated and only the power required to cool the recirculated air is expended.

As discussed above with reference to FIG. 1, in the conventional system architecture 100, the engines 110 provide the majority of secondary aircraft power in pneumatic form from bleed air. In contrast, in the system architecture 300 of the present invention, the engines 310 provide the majority of secondary aircraft power in electrical form from the starter/generators 316. Eliminating the pneumatic bleed ports from the compressor portions of the engines 310 results in a more efficient engine design by reducing compressor capacity requirements and improving the operating cycle. Furthermore, eliminating the maintenance intensive bleed system is expected to reduce aircraft maintenance needs and improve aircraft reliability because there are fewer components on the engine and fewer pneumatic ducts, pre-coolers and valves in the distribution system. In addition, measures to protect against duct burst and over-temperature conditions are unnecessary with the electric-based system architecture 300.

A further advantage of the electric-based system architecture 300 is that it can utilize motor controllers to tailor the individual loads to extract only the minimum amount of power necessary from the engines 310 at any operating condition. Because these loads are adjustable rather than simply on or off, less power is withdrawn from the engines 310. The ability to tailor the power consumption for any electrical power load can directly improve aircraft fuel efficiency. Other benefits associated with the electric-based system architecture 300 can include the following: real-time power extraction optimization and elimination of waste associated with engine bleed air; enhanced air quality; potential reduction in non-recurring engineering associated with certification of a multiple engine bleed air system.

Although the system architecture 300 described above with reference to FIG. 3 includes two engines with two starter/generators per engine, in other embodiments, system architectures configured in accordance with the present invention can include more or fewer engines having more or fewer generators depending on the needs of the particular application. For example, in one other embodiment, a system architecture configured in accordance with the present inventing can include four jet engines, each having a single starter/generator. In yet another embodiment, a system architecture configured in accordance with the present invention can include only a single engine having two or more generators or starter/generators. Accordingly, the invention is not limited to aircraft having a particular number of engines or starter/generators.

Figure 1:
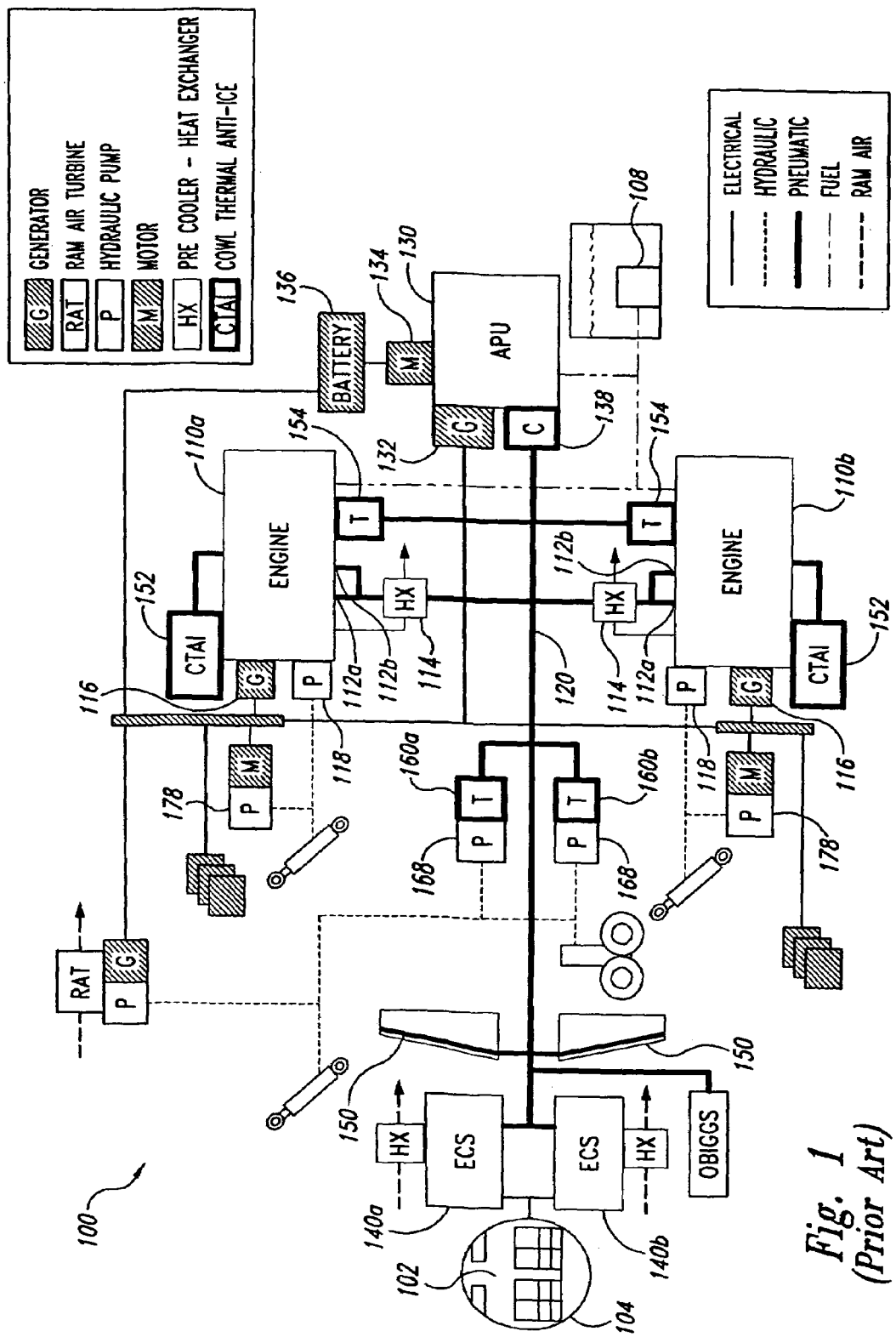
FIG. 1 is a schematic diagram of a conventional pneumatic-based secondary power system architecture configured in accordance with the prior art.

In addition, although the engines 310 described above with reference to FIG. 3 provide electric power for secondary aircraft systems via the starter/generators 316, in other embodiments, the engines 310 can also include one or more bleed ports similar to those disclosed in FIG. 1 for providing pneumatic power to one or more secondary systems. In these embodiments, power can be provided to one or more of the air conditioning packs 340, the wing ice protection system 350, and/or the hydraulic pump 368 in the form of pneumatic power or pneumatic and electric power. Similarly, in other embodiments, the APU 330 can also provide pneumatic power in addition to electric power. Accordingly, the invention is not limited to aircraft utilizing strictly electric power for secondary systems, but can extend in various embodiments to aircraft using various combinations of electric power, pneumatic power, or electric and pneumatic power.

Figure 4:
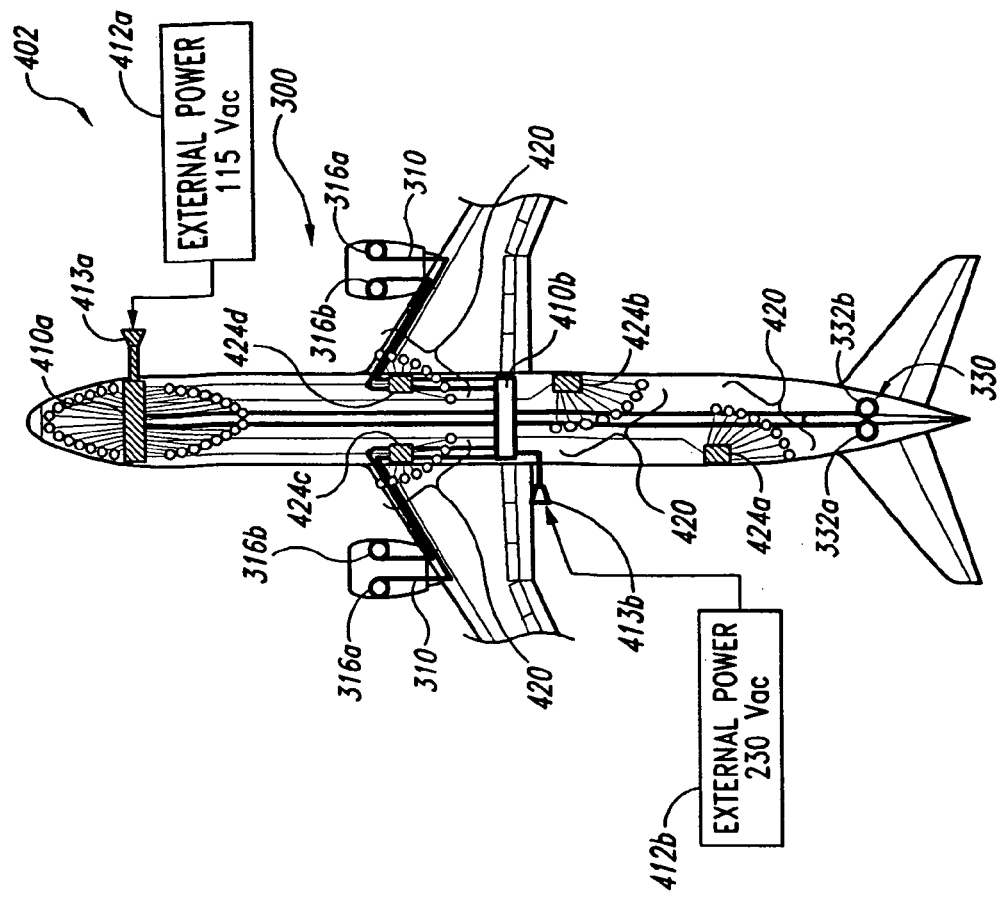
FIG. 4 is a schematic top view of an aircraft having the system architecture of FIG. 3 configured in accordance with an embodiment of the invention.
Figure 2:
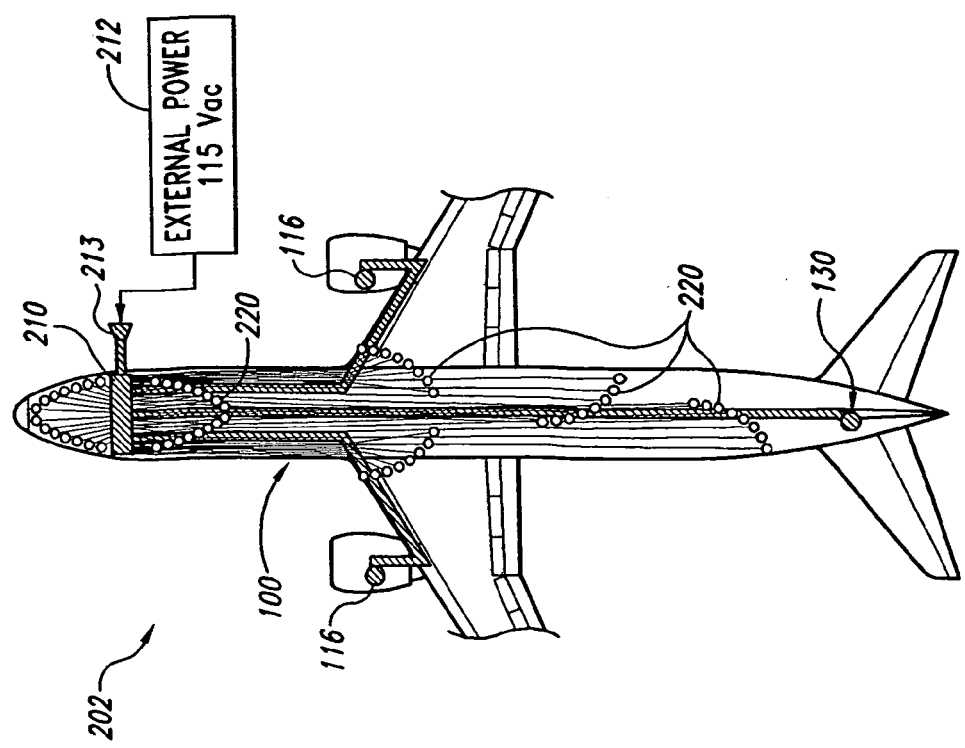
FIG. 2 is a schematic top view of a conventional aircraft having the system architecture of FIG. 1.

FIG. 4 is a schematic top view of an aircraft 402 that includes the electric-based system architecture 300 of FIG. 3 configured in accordance with an embodiment of the invention. The aircraft 402 can include the four starter/generators 316 coupled to the two engines 310, and the two starter/generators 332 coupled to the APU 330 mounted in the tail of the aircraft 402. In one aspect of this embodiment, the aircraft 402 can further include two ground receptacles 413 (identified as a first ground receptacle 413a and a second ground receptacle 413b) configured to receive 115 Vac or 230 Vac power from external power sources 412a and 412b, respectively.

In another aspect of this embodiment, the aircraft 402 can include a forward electrical equipment bay 410a and an aft electrical equipment bay 410b. Four remote power distribution units (RPDUs) 424a–d can distribute electrical power from the equipment bays 410 to a plurality of system loads 420 associated with the system architecture 300. The RPDUs 424 can be largely based on solid state power controllers instead of traditional thermal circuit-breakers and relays.

Figure 5:
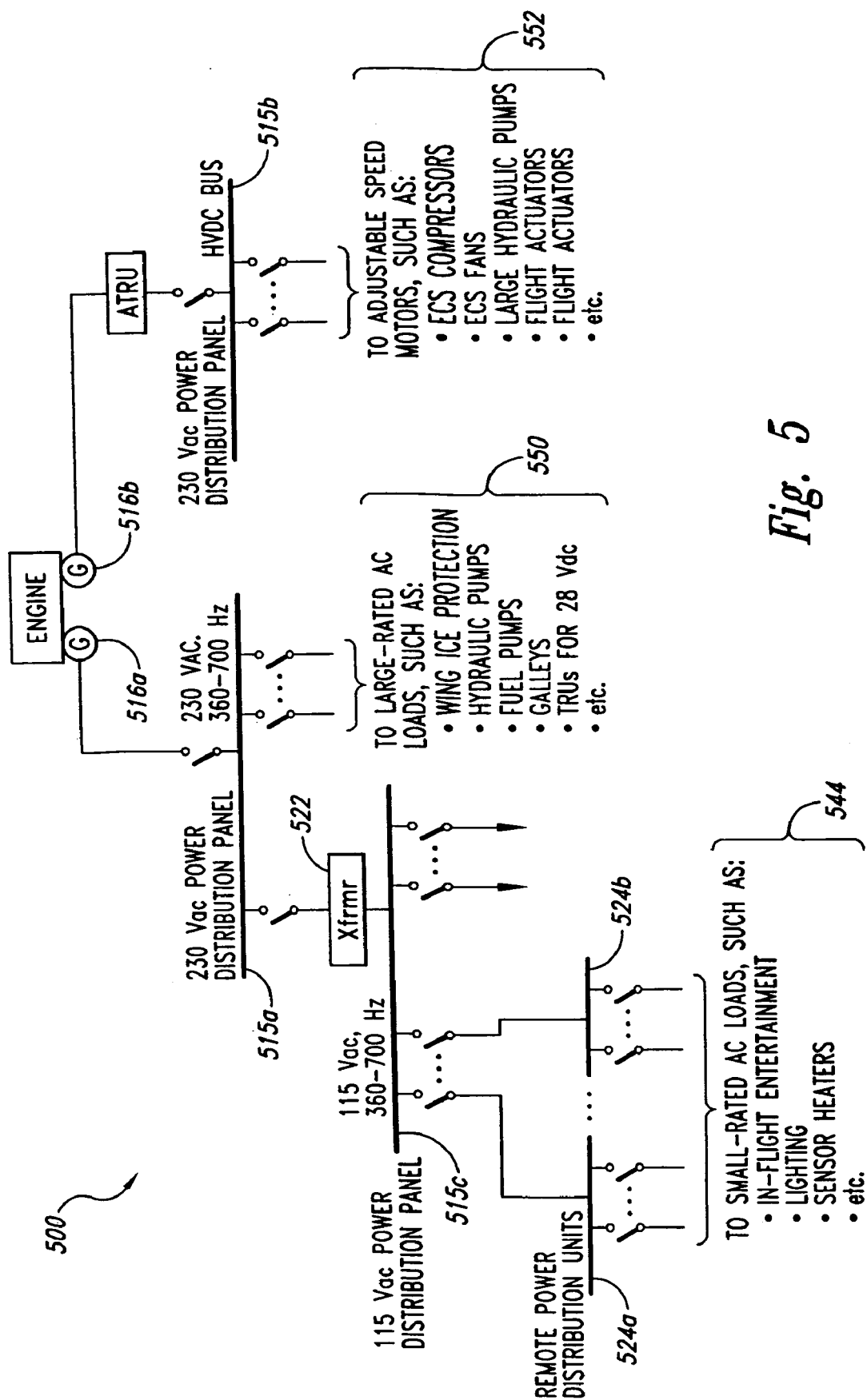
FIG. 5 is a schematic diagram of an aircraft electric power distribution system configured in accordance with an embodiment of the invention.

FIG. 5 is a schematic diagram of an aircraft electric power distribution system 500 configured in accordance with an embodiment of the invention. In one aspect of this embodiment, the power distribution system 500 includes a first generator 516a and a second generator 516b operably coupled to an aircraft engine 510. In one embodiment, the first generator 516a and the second generator 516b can be high voltage AC generators (such as 230 Vac generators). In another embodiment, one of the two generators 516 can be a high voltage DC generator (such as a ±270 Vdc generator). The AC generator 516a can provide electrical power to aircraft equipment that is insensitive to the supply frequency. The DC generator 516b can provide electrical power to those components of the aircraft system that include adjustable speed motors. In other embodiments, the generators 516 can be other types of generators. For example, in one other embodiment, both of the generators 516 can be AC generators. In this embodiment, the DC power needs of the system can be met with suitable AC-to-DC conversion devices. In another embodiment, both of the generators 516 can be DC generators, and the AC power needs of the system can be met with suitable DC-to-AC conversion devices.

In another aspect of this embodiment, the power distribution system 500 can further include a first bus 515a configured to receive power from the first generator 516a, and a second bus 515b configured to receive power from the second generator 516b. In one embodiment, the first bus 515a can be a high voltage AC bus, such as a 230 Vac bus, configured to supply power directly to a plurality of large-rated AC loads 550. Such loads may be associated with wing ice protection equipment, hydraulic pumps, fuel pumps, galley systems, and the like. In addition, the first bus 515a can also provide power directly to a third bus 515c via a step-down transformer 522. In one embodiment, the third bus 515c can be a lower voltage AC bus, such as a 115 Vac bus. The third bus 515c can provide power to a plurality of small-rated AC equipment loads 544 on the aircraft via a plurality of RPDUs (identified as a first RPDU 524a and at least a second RPDU 524b). Such small-rated loads 544 may be associated with in-flight entertainment systems, interior and exterior lighting systems, sensor heaters, and the like.

In a further aspect of this embodiment, the second bus 515b can supply electrical power to a plurality of adjustable speed motors 552 on the aircraft. Such motors can include cabin pressurization compressors, environmental control system fans, vapor or air cycle ECS packs, large hydraulic pumps, flight actuators, and the like. Use of a high voltage DC system can avoid potential harmonic distortion problems often associated with motor controllers, and can provide a means for accommodating re-generative energy often associated with electro-hydrostatic actuators. In addition, the use of a high voltage DC system can also provide a significant weight savings through utilization of lightweight DC generators and the elimination of harmonic distortion treatment devices and regenerative energy absorption devices.

Figure 6:
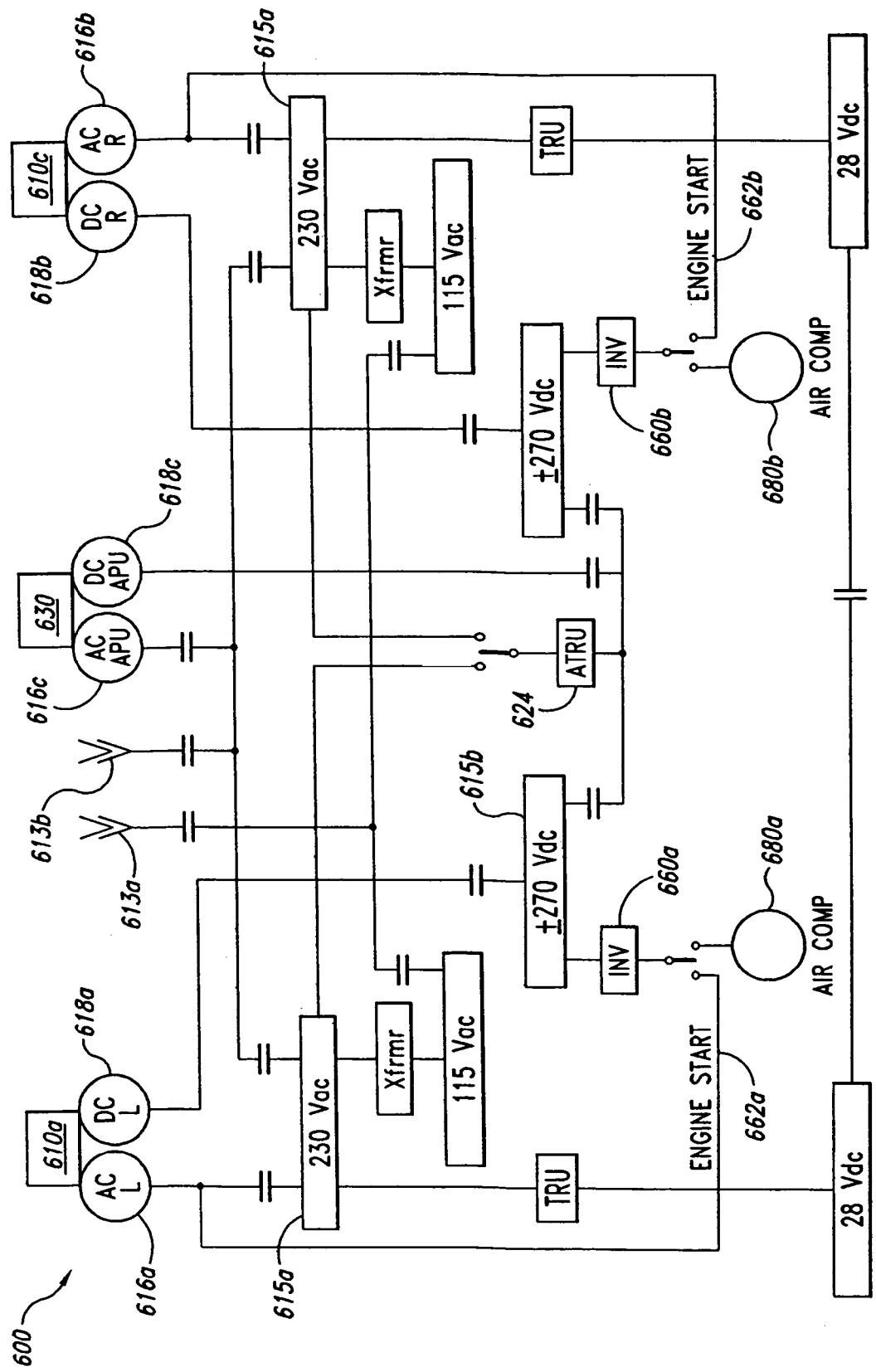
FIG. 6 is a schematic diagram of an aircraft electric power distribution system configured in accordance with another embodiment of the invention.

FIG. 6 is a schematic diagram of an aircraft electric power distribution system 600 configured in accordance with another embodiment of the invention. In one aspect of this embodiment, the power distribution system 600 includes a first aircraft engine 610a, a second aircraft engine 610b, and an APU 630. The power distribution system 600 can further include three AC generators 616 (identified individually as a first AC generator 616a, a second AC generator 616b, and a third AC generator 616c), and three DC generators 618 (identified individually as a first DC generator 618a, a second DC generator 618b and a third DC generator 618c). The first AC generator 616a and the first DC generator 618a can be operably coupled to the first engine 610a. Similarly, the second AC generator 616b and the second DC generator 618b can be operably coupled to the second engine 610b. The third AC generator 616c and the third DC generator 618c can be operably coupled to the APU 630. The third AC generator 616c can provide electrical power from the APU 630 to two AC buses 615a to service AC loads (not shown) during ground operations and flight as needed. The third DC generator 618c operably coupled to the APU 630 can provide electrical power to two DC buses 615b to service adjustable speed motors (also not shown) during ground operations and flight as needed. In addition, the third AC generator 616c can also provide power to the two DC buses 615b via an AC-to-DC conversion device 624. Each of the two DC buses 615b can be operably connected to a corresponding motor controller 660 (identified individually as a first motor controller 660a and a second motor controller 660b). The motor controllers 660 can be configured to selectively provide electrical power to either cabin pressurization compressors 680 (identified individually as a first compressor 680a and a second compressor 680b) or engine start circuits 662 (identified individually as a first start circuit 662a and a second start circuit 662b). In another aspect of this embodiment, the power distribution system 600 can include a first electrical receptacle 613a and a second electrical receptacle 613b configured to receive power from external ground power sources. In one embodiment, the first receptacle 613a can be configured to receive 115 Vac power from a ground source and the second receptacle 613b can be configured to receive 230 Vac power from an external ground source.

In one embodiment, high voltage (e.g., 230 Vac) ground power received through the second receptacle 613b can be used to start the engines 610. In this embodiment, the motor controllers 660 are switched so that power from the DC buses 615b is directed to the corresponding engine start circuit 662. This power is directed to the corresponding AC generator 616 and used to run the AC generator 616 as a synchronous motor to crank the corresponding engine 610 for starting. Once the engine 610 is started, the motor controller 660 switches back to provide electrical power to the cabin pressurization compressor 680.

Figure 7:
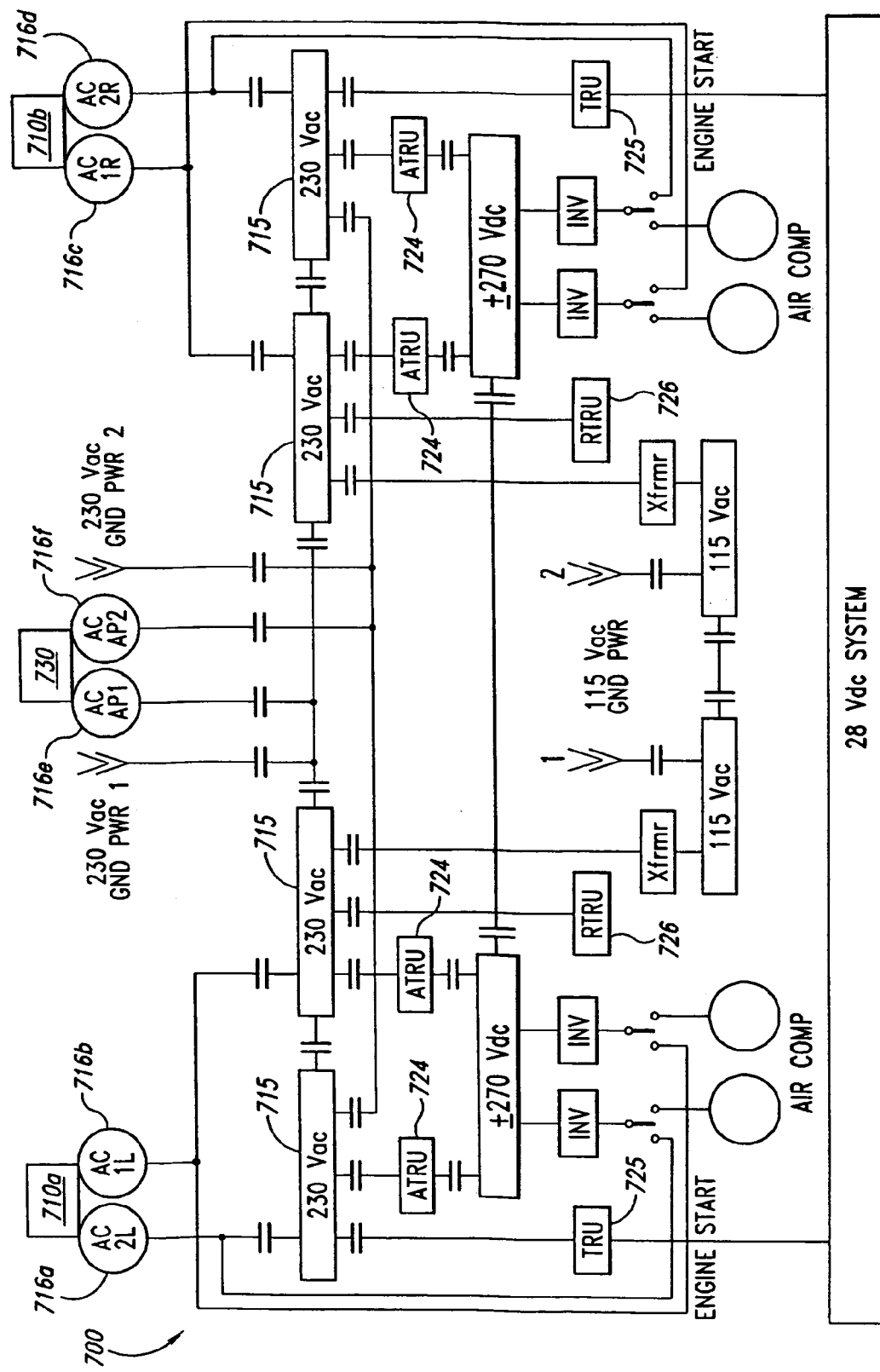
FIG. 7 is a schematic diagram of an aircraft electric power distribution system having only AC generators in accordance with a further embodiment of the invention.

FIG. 7 illustrates a schematic diagram of an electric power distribution system 700 having only AC generators in accordance with another embodiment of the invention. The power distribution system 700 includes a first engine 710a, a second engine 710b, and an APU 730. In one aspect of this embodiment, first and second AC generators 716a and 716b are operably coupled to the first engine 710a, third and fourth AC generators 716c and 716d are operably coupled to the second engine 710b, and fifth and sixth AC generators 716e and 716f are operably coupled to the APU 730. To meet DC voltage needs, high voltage AC power from the engines 710 and the APU 730 can be converted to high voltage DC power by one or more AC-to-DC conversion devices, such as auto transformer rectifier units (ATRUs) 724, that receive AC power from AC buses 715. Use of the ATRUs 724 allows the power distribution system 700 to provide both high voltage AC and DC power to support conventional 115 Vac and 28 Vdc bus architectures. In addition, AC power from one or more of the AC generators 716 can also be converted to DC power for a 28 Vdc bus 719 by unregulated transformer rectifier units 725 and regulated transformer rectifier units 726. In another aspect of this embodiment, having two AC generators 716 coupled to each of the engines 710 allows both of the AC generators 716 to be used as synchronous starting motors for added engine starting power, if desired. As discussed above with reference to FIG. 3, the embodiments of the invention described above with reference to FIGS. 5–7 are not limited to the particular number of engines and/or starter/generators illustrated, but extend to other quantities of engines and starter/generators in different configurations.

Figure 8C:
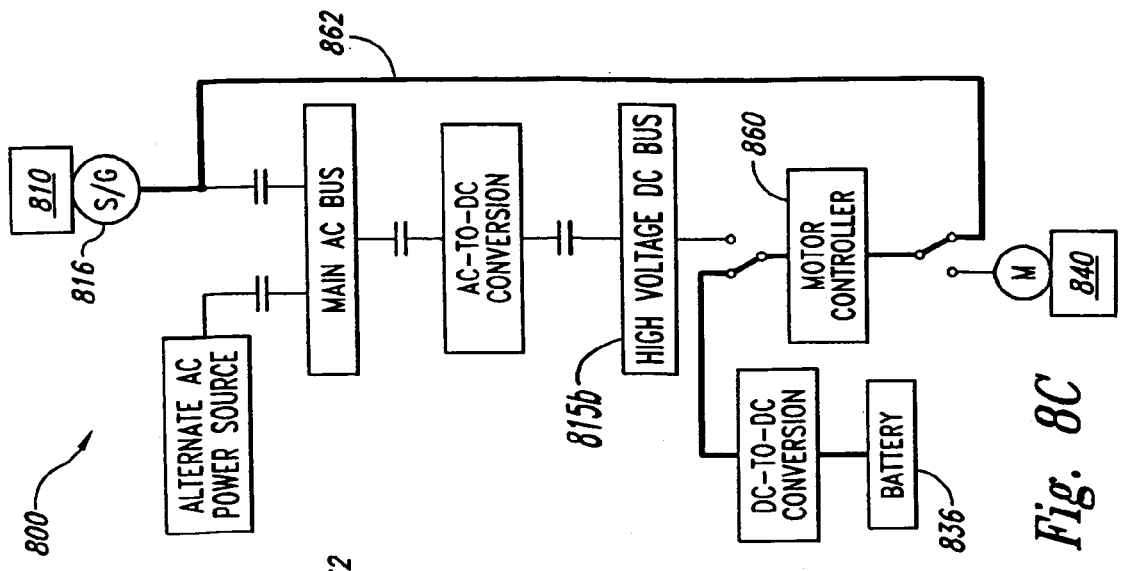
FIGS. 8A–8C are schematic diagrams illustrating an electric power distribution system having an engine start circuit configured in accordance with an embodiment of the invention.
Figure 8B:
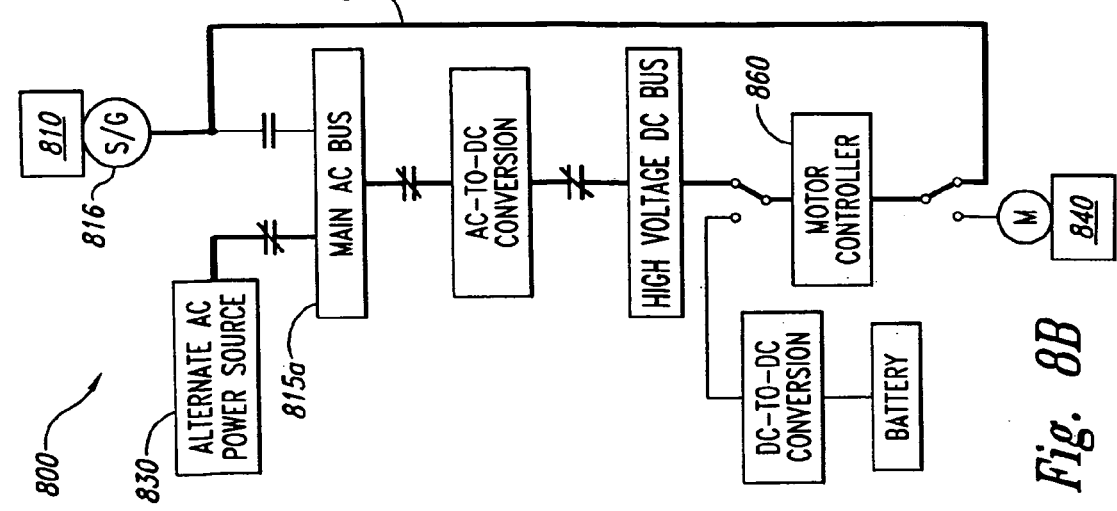
Figure 8A:
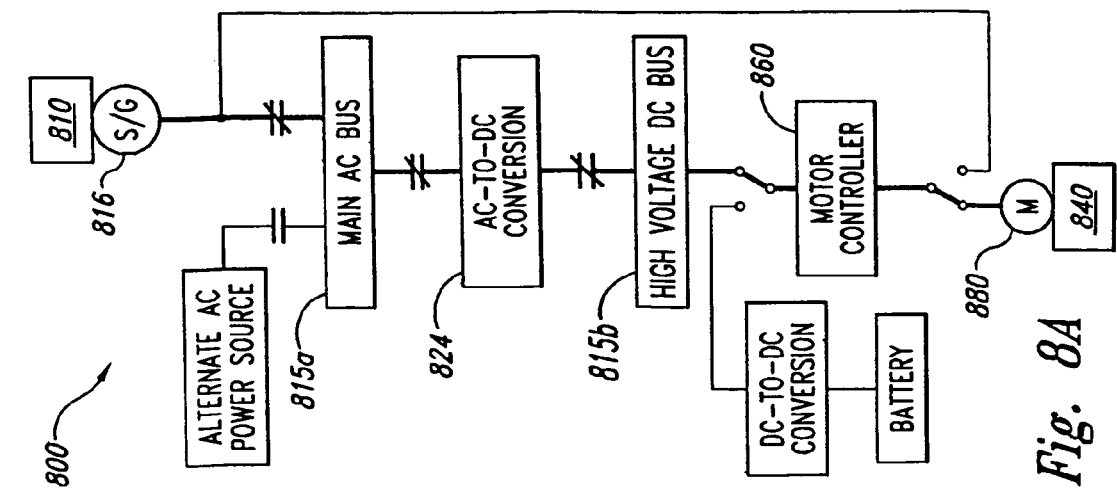

FIGS. 8A–8C are schematic diagrams illustrating an electric power distribution system 800 having an engine start circuit configured in accordance with an embodiment of the invention. Referring first to FIG. 8A, in one aspect of this embodiment, the power distribution system 800 includes a generator 816 operably coupled to an engine 810, and a compressor motor 880 operably coupled to an environmental control system 840. The generator 816 can provide electric power to a motor controller 860 via an AC bus 815a, an AC-to-DC conversion device 824, and a high voltage DC bus 815b. During normal operation as illustrated in FIG. 8A, the motor controller 860 can selectively direct the electric power to the compressor motor 880 for operation of the ECS 840.

FIG. 8B illustrates an engine starting configuration of the power distribution system 800. Because the engine 810 is initially not running in this configuration, power is provided to the motor controller 860 by an alternate AC power source 830 rather than the generator 816. In one embodiment, the alternate power source 830 can include an APU or an external power source. In one aspect of this embodiment, the motor controller 860 selectively directs the electric power from the alternate power source 830 to an engine start circuit 862. The engine start circuit 862 provides the electrical power to the generator 816, which is configured to run as a synchronous motor for starting the engine 810.

FIG. 8C illustrates another engine starting configuration of the power distribution system 800. Here, power for starting the engine 810 is provided by a battery 836. In one aspect of this embodiment, the motor controller 860 selectively opens the circuit to the high voltage DC bus 815b so it can receive electric power from the battery 836. After connecting to the battery 836, the motor controller directs the electric power to the generator 816 via the engine start circuit 862 as described above.

From the foregoing, it will be appreciated that specific embodiments of the invention have been described herein for purposes of illustration, but that various modifications may be made without deviating from the spirit and scope of the invention. Accordingly, the invention is not limited, except as by the appended claims.

We claim:

1. A method for providing conditioned air to a fuselage of an aircraft, the aircraft including a jet engine configured to provide propulsive thrust to the aircraft, the method comprising:

operably coupling an electric generator to the jet engine, the electric generator configured to receive shaft power from the jet engine;

operably coupling an electric motor to a compressor fan to drive the compressor fan, the compressor fan being positioned in flow communication with the fuselage; and providing electric power from the electric generator to the electric motor to drive the compressor fan and flow air from outside the fuselage into the fuselage in the absence of bleed air from the jet engine.

2. The method of claim 1, further comprising:

positioning a resistive heater downstream of the compressor fan; and conducting electric power from the electric generator to the resistive heater to warm the outside air before the outside air flows into the fuselage.

3. The method of claim 1 wherein operably coupling an electric motor to the compressor fan includes operably coupling an adjustable speed electric motor to the compressor fan, wherein the method further comprises modulating the speed of the electric motor in response to changes in the pressurization requirements of the fuselage.

4. The method of claim 1 wherein operably coupling an electric motor to the compressor fan includes operably coupling an adjustable speed electric motor to the compressor fan, wherein the method further comprises modulating the speed of the electric motor in response to changes in the temperature requirements of the fuselage.

5. On a transport aircraft having a fuselage, a wing extending outwardly from the fuselage, and a jet engine for providing propulsive thrust, a method for providing secondary power from the jet engine to a plurality of aircraft systems including an environmental control system, a wing ice protection system, and a landing gear system, the method for providing secondary power comprising:

operably coupling an electric generator to the jet engine, the electric generator configured to receive shaft power from the jet engine;

providing electric power from the electric generator to a fan motor of the environmental control system, the environmental control system configured to provide conditioned air to at least a portion of the fuselage in the absence of bleed air from the jet engine;

providing electric power from the electric generator to a heating element of the wing ice protection system, the wing ice protection system configured to at least reduce the formation of ice on a portion of the wing in the absence of bleed air from the jet engine; and providing electric power from the electric generator to an electric-motor driven hydraulic pump of the landing gear system, the hydraulic pump configured to operate a landing gear in the absence of bleed air from the jet engine.

6. The method of claim 5 wherein the electric generator operably coupled to the jet engine is a first electric generator, and wherein the method further comprises:

installing an auxiliary power unit on the aircraft;

operably coupling a second electric generator to the auxiliary power unit, wherein the second electric generator is configured to receive shaft power from the auxiliary power unit; and providing electric power from the second electric generator to the fan motor of the environmental control system, the environmental control system configured to provide conditioned air to at least a portion of the fuselage in the absence of compressed air from the auxiliary power unit.

7. The method of claim 5 wherein the electric generator operably coupled to the jet engine is a first electric generator, and wherein the method comprises:

installing an auxiliary power unit on the aircraft;

operably coupling a second electric generator to the auxiliary power unit, wherein the second electric generator is configured to receive shaft power from the auxiliary power unit; and providing electric power from the electric generator to the electric motor-driven hydraulic pump of the landing gear system, the hydraulic pump configured to operate a landing gear in the absence of pneumatic power from the auxiliary power unit.

* * * * *